United States Patent
Kazama

(10) Patent No.: US 12,352,400 B2
(45) Date of Patent: *Jul. 8, 2025

(54) MICROLENS ARRAY AND VEHICLE LAMP USING MICROLENS ARRAY

(71) Applicant: KOITO MANUFACTURING CO., LTD., Tokyo (JP)

(72) Inventor: Ayaka Kazama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/687,938

(22) PCT Filed: Aug. 12, 2022

(86) PCT No.: PCT/JP2022/030748
§ 371 (c)(1),
(2) Date: Feb. 29, 2024

(87) PCT Pub. No.: WO2023/032638
PCT Pub. Date: Mar. 9, 2023

(65) Prior Publication Data
US 2024/0426447 A1 Dec. 26, 2024

(30) Foreign Application Priority Data

| Aug. 30, 2021 | (JP) | 2021-139973 |
| Aug. 30, 2021 | (JP) | 2021-139974 |
| Aug. 30, 2021 | (JP) | 2021-139975 |

(51) Int. Cl.
*F21S 41/265* (2018.01)
*F21S 41/143* (2018.01)
*F21S 41/151* (2018.01)

(52) U.S. Cl.
CPC ........... *F21S 41/265* (2018.01); *F21S 41/143* (2018.01); *F21S 41/151* (2018.01)

(58) Field of Classification Search
CPC ........ F21S 41/265; F21S 41/25; F21S 41/255; F21S 41/26; F21S 41/27
See application file for complete search history.

(56) References Cited

U.S. PATENT DOCUMENTS

| 9,976,720 B2* | 5/2018 | Owada ................. F21S 41/322 |
| 10,605,426 B2* | 3/2020 | Qiu ....................... F21S 41/322 |

(Continued)

FOREIGN PATENT DOCUMENTS

| JP | 2000-330101 A | 11/2000 |
| JP | 2007-328218 A | 12/2007 |

(Continued)

OTHER PUBLICATIONS

International Search Report in corresponding International Application No. PCT/JP2022/030748, dated Nov. 1, 2022 (9 pages).

(Continued)

*Primary Examiner* — Matthew J. Peerce
(74) *Attorney, Agent, or Firm* — Osha Bergman Watanabe & Burton LLP

(57) ABSTRACT

A microlens array includes a plurality of optical systems. Each of the optical systems includes a pair of an incidence-side lens portion and an emission-side lens portion, respectively. A low refractive index portion is provided between an incident surface of the incidence-side lens portion and an emission surface of the emission-side lens portion. A refractive index of the low refractive index portion is lower than refractive indexes of other portions. The low refractive index portion comprises a first surface extending through a focus of the emission surface and a second surface extending from the first surface toward the incident surface. A cut line forming portion is formed by a boundary portion between the first surface and the second surface. The incident surface (Continued)

is provided at a position that does not overlap the second surface in a front view of the incidence-side lens portion.

6 Claims, 16 Drawing Sheets

(56) References Cited

U.S. PATENT DOCUMENTS

| | | | | |
|---|---|---|---|---|
| 10,690,309 B2* | 6/2020 | Gromfeld | ............ | F21S 41/265 |
| 10,962,191 B1 | 3/2021 | Go et al. | | |
| 11,662,075 B2* | 5/2023 | Lee | ............ | F21S 41/143 |
| | | | | 362/521 |
| 11,713,858 B2* | 8/2023 | Nishimura | ............ | F21S 41/265 |
| | | | | 362/509 |
| 2014/0232995 A1 | 8/2014 | Okamoto | | |
| 2016/0265733 A1* | 9/2016 | Bauer | ............ | F21S 41/16 |
| 2019/0024865 A1 | 1/2019 | Kim et al. | | |
| 2019/0049648 A1* | 2/2019 | Calais | ............ | F21S 43/239 |
| 2021/0341123 A1 | 11/2021 | Mototsuji | | |

FOREIGN PATENT DOCUMENTS

| | | |
|---|---|---|
| JP | 2014-163973 A | 9/2014 |
| JP | 2015-115165 A | 6/2015 |
| JP | 2016-009065 A | 1/2016 |
| JP | 2016-534503 A | 11/2016 |
| JP | 2020-061231 A | 4/2020 |
| KR | 2019-0078814 A | 7/2019 |

OTHER PUBLICATIONS

Written Opinion in corresponding International Application No. PCT/JP2022/030748, dated Nov. 1, 2022 (6 pages).

The extended European search report issued in corresponding European Patent Application No. 22864223.7, mailed on Dec. 3, 2024 (8 pages).

* cited by examiner

MICROLENS ARRAY AND VEHICLE LAMP USING MICROLENS ARRAY

TECHNICAL FIELD

The present disclosure relates to a microlens array and a vehicle lamp using the microlens array.

BACKGROUND ART

According to Patent Literature 1 and the like, a vehicle lamp for irradiating forward of the lamp via a microlens array is known.

CITATION LIST

Patent Literature

Patent Literature 1: JP-A-2016-534503

SUMMARY OF INVENTION

Technical Problem

The microlens array described in Patent Literature 1 includes a light shielding plate between a rear-side lens array and a front-side lens array. The light shielding plate shields part of light emitted from a light source unit to form a low beam light distribution pattern with a cutoff line.

In addition, optical systems of the microlens array described in Patent Literature 1 are aligned in a first direction and a second direction orthogonal to the first direction. An emission-side lens portion of each of the optical systems has an emission surface of a curved shape whether seen in the first direction (for example, a vertical direction) or the second direction (for example, a horizontal direction) orthogonal to the first direction.

In such a vehicle lamp, part of the light emitted from the light source is shielded by the light shielding plate and is not emitted forward of the lamp, so there is room for improvement in utilization efficiency of light.

The present disclosure is intended to provide a microlens array with high utilization efficiency of light and a vehicle lamp using the microlens array.

In addition, the inventors studied a configuration that allows part of light emitted from a light source to be emitted forward without shielding the light in order to increase utilization efficiency of light, and at the same time, a configuration that reduces an occurrence of glare.

The present disclosure is intended to provide a microlens array that reduces an occurrence of glare while increasing utilization efficiency of light, and a vehicle lamp using the microlens array.

In addition, the microlens array according to Patent Literature 1 is configured to effectively condense light that has passed through an inside of the microlens array and to project a light distribution pattern. However, in order to diffuse the emitted light over a wider range, a microlens array of a new configuration is needed.

The present disclosure is intended to provide a microlens array that diffuses emitted light more widely, and a vehicle lamp using the microlens array.

Solution to Problem

A microlens array according to a first aspect of the present disclosure is a microlens array including a plurality of optical systems, in which each of the optical systems includes a pair of an incidence-side lens portion and an emission-side lens portion, respectively,
a low refractive index portion is provided between an incident surface of the incidence-side lens portion and an emission surface of the emission-side lens portion,
a refractive index of the low refractive index portion is lower than refractive indexes of other portions,
the low refractive index portion includes a first surface extending through a focus of the emission surface and a second surface extending from the first surface toward the incident surface,
a cut line forming portion is formed by a boundary portion between the first surface and the second surface, and
the incident surface is provided at a position that does not overlap the second surface in a front view of the incidence-side lens portion.

A vehicle lamp according to a second aspect of the present disclosure includes:
a light source; and
the microlens array according to the first aspect.

A microlens array according to a third aspect of the present disclosure is a microlens array including a plurality of optical systems, in which each of the optical systems includes a pair of an incidence-side lens portion and an emission-side lens portion, respectively,
a low refractive index portion is provided between an incident surface of the incidence-side lens portion and an emission surface of the emission-side lens portion,
the refractive index of the low refractive index portion is lower than refractive indexes of other portions,
the low refractive index portion includes a first surface extending through a focus of the emission surface and a second surface extending from the first surface toward the incident surface,
a cut line forming portion is formed by a boundary portion between the first surface and the second surface, and
a ratio A:B of a thickness A from the incident surface of the incidence-side lens portion to the boundary portion and a thickness B from the boundary portion to the emission surface of the emission-side lens portion is 1.8:1 or greater.

A vehicle lamp according to a fourth aspect of the present disclosure includes:
a light source; and
the microlens array according to the third aspect.

A microlens array according to a fifth aspect of the present disclosure is a microlens array including a plurality of optical systems, in which each of the optical systems has a pair of an incidence-side lens portion and an emission-side lens portion, respectively,
the plurality of optical systems are aligned in at least a first direction and a second direction orthogonal to the first direction, and
at least a part of the optical systems constitutes a diffusion part in which an emission surface of the emission-side lens portion forms a flat surface when seen in the first direction and a curved surface when seen in the second direction.

A vehicle lamp according to a sixth aspect of the present disclosure includes:
a light source;
the microlens array according to the fifth aspect; and
a primary lens configured to cause light emitted from the light source to be incident on the microlens array.

Advantageous Effects

According to the present disclosure, it is possible to provide a microlens array that reduces an occurrence of glare while increasing utilization efficiency of light, and a vehicle lamp using the microlens array.

According to the present disclosure, it is possible to provide a microlens array with high utilization efficiency of light, and a vehicle lamp using the microlens array.

According to the present disclosure, it is possible to provide a microlens array that diffuses emitted light more widely, and a vehicle lamp using the microlens array.

DESCRIPTION OF EMBODIMENTS

Figure 1:
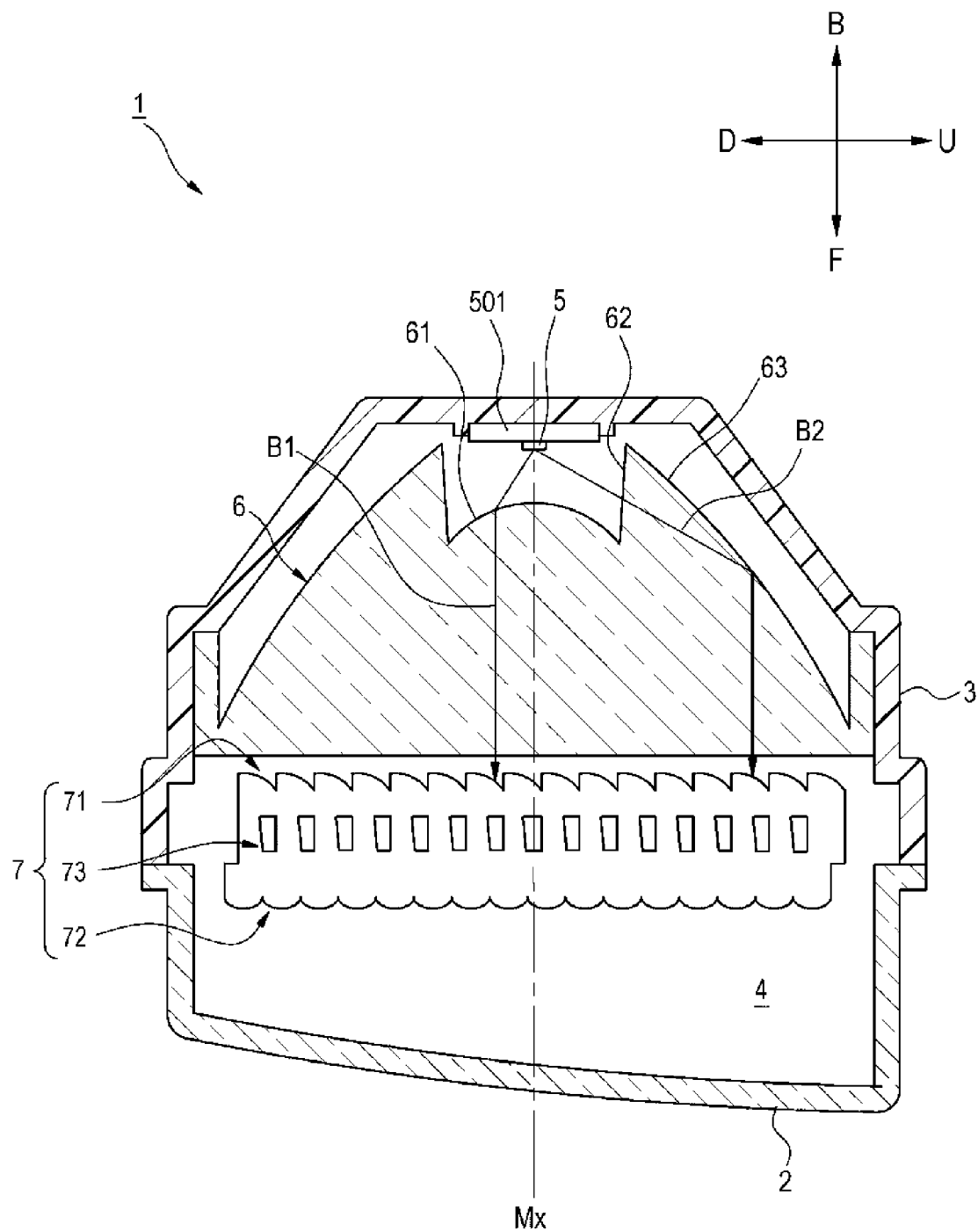
FIG. 1 is a schematic cross-sectional view of a vehicle lamp according to an embodiment of the present disclosure, seen in a left-right direction.

Hereinafter, examples of embodiments of the present disclosure will be described with reference to the drawings. The same or equivalent components or members shown in each drawing are denoted with the same reference numerals, and overlapping descriptions are omitted appropriately. In addition, in each drawing, the scale is appropriately changed to make each member recognizable.

Further, the embodiments are illustrative, not limiting the invention, and all features or combinations thereof described in the embodiments are not necessarily essential to the invention.

In addition, in the description of the present embodiment, for convenience of description, "left-right direction", "front-back direction", and "up-down direction" are appropriately referred to. Here, the "up-down direction" is a direction including an "up direction" and a "down direction". The "front-back direction" is a direction including a "front direction" and a "back direction". The "left-right direction" is a direction including a "left direction" and a "right direction". The reference sign U shown in the drawings described below indicates the up direction. The reference sign D indicates the down direction. The reference sign F indicates the front direction. The reference sign B indicates the back direction. The reference sign L indicates the left direction. The reference sign R indicates the right direction. Note that it cannot be said that these directions coincide with the respective directions set for a vehicle in a state in which a microlens array and a vehicle lamp are attached to the vehicle.

FIG. 1 is a schematic cross-sectional view of a vehicle lamp 1 according to an embodiment of the present disclosure. As shown in FIG. 1, a vehicle lamp 1 includes an outer cover 2 and a housing 3. A lamp chamber 4 is formed by the outer cover 2 and the housing 3.

In the lamp chamber 4, a light source 5, a primary lens 6, and a microlens array 7 are provided. The light source 5 is arranged facing toward the front direction in a state of being mounted on a substrate 501 supported by the housing 3. As the light source 5, for example, a light emitting diode (LED) or a laser diode (LD) can be used. The light emitted from the light source 5 passes through the primary lens 6 and the microlens array 7 and is emitted in the front direction of the vehicle lamp 1. In the following description, a virtual straight line extending from a center point of a light emitting surface of the light source 5 in the front-back direction of the vehicle lamp 1 is referred to as a main optical axis Mx of the vehicle lamp 1.

The primary lens 6 converts the light emitted from the light source 5 into parallel light and causes the parallel light to be incident on the microlens array 7. As the primary lens 6, a collimating lens, an aplanat lens, a Fresnel lens, or the like can be used. The primary lens 6 shown in FIG. 1 has a first incidence portion 61 provided at a position facing the light source 5, and a second incidence portion 62 provided as a vertical wall surrounding the first incidence portion 61. Light B1 incident on the first incidence portion 61 from the light source 5 is refracted on the first incidence portion 61, for example, in order to be parallel light to the main optical axis Mx. Light B2 incident on the second incidence portion 62 from the light source 5 is reflected by a reflective surface 63 in order to be parallel light to the main optical axis Mx.

Note that in the vehicle lamp 1 shown in FIG. 1, one light source unit is configured by the light source 5, the primary lens 6 and the microlens array 7. The vehicle lamp 1 may include a plurality of light source units in the same light chamber 4.

The microlens array 7 is an optical component formed of, for example, a transparent resin material or a glass material.

First Embodiment

Figure 2:
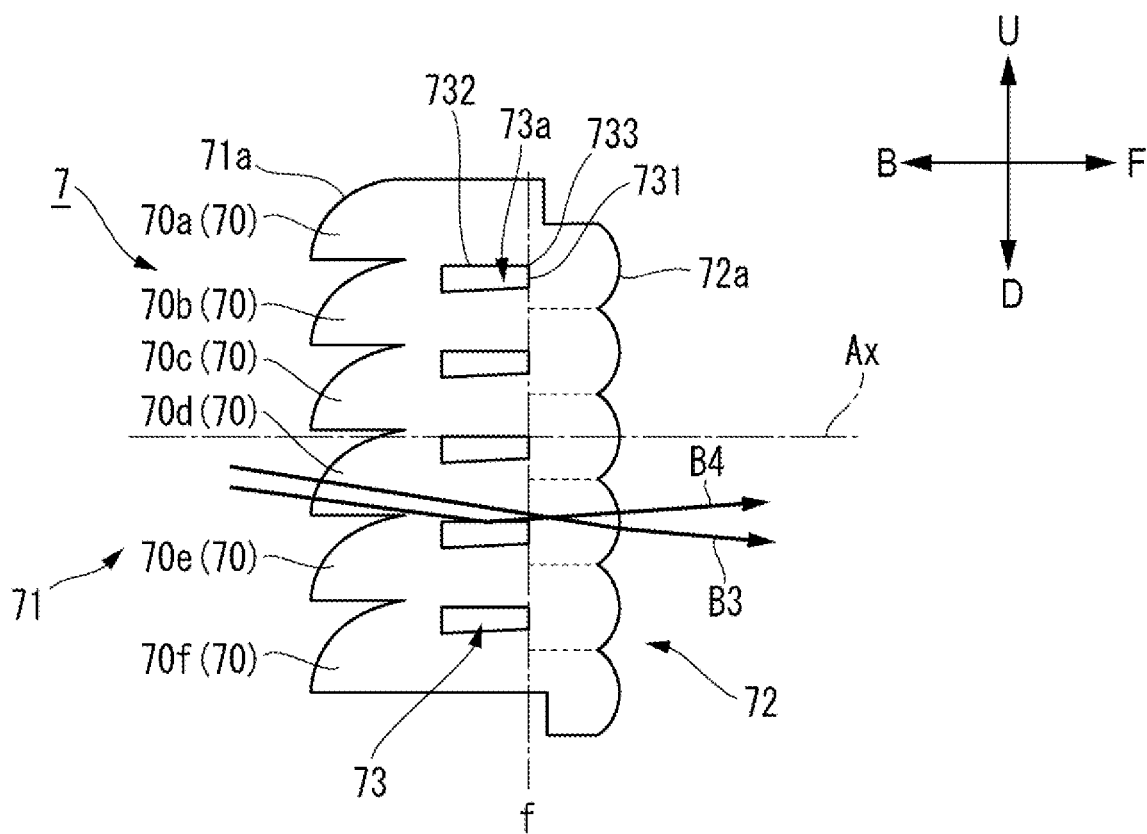
FIG. 2 is a cross-sectional view of a microlens array according to a first embodiment, seen in a right direction.
Figure 3:
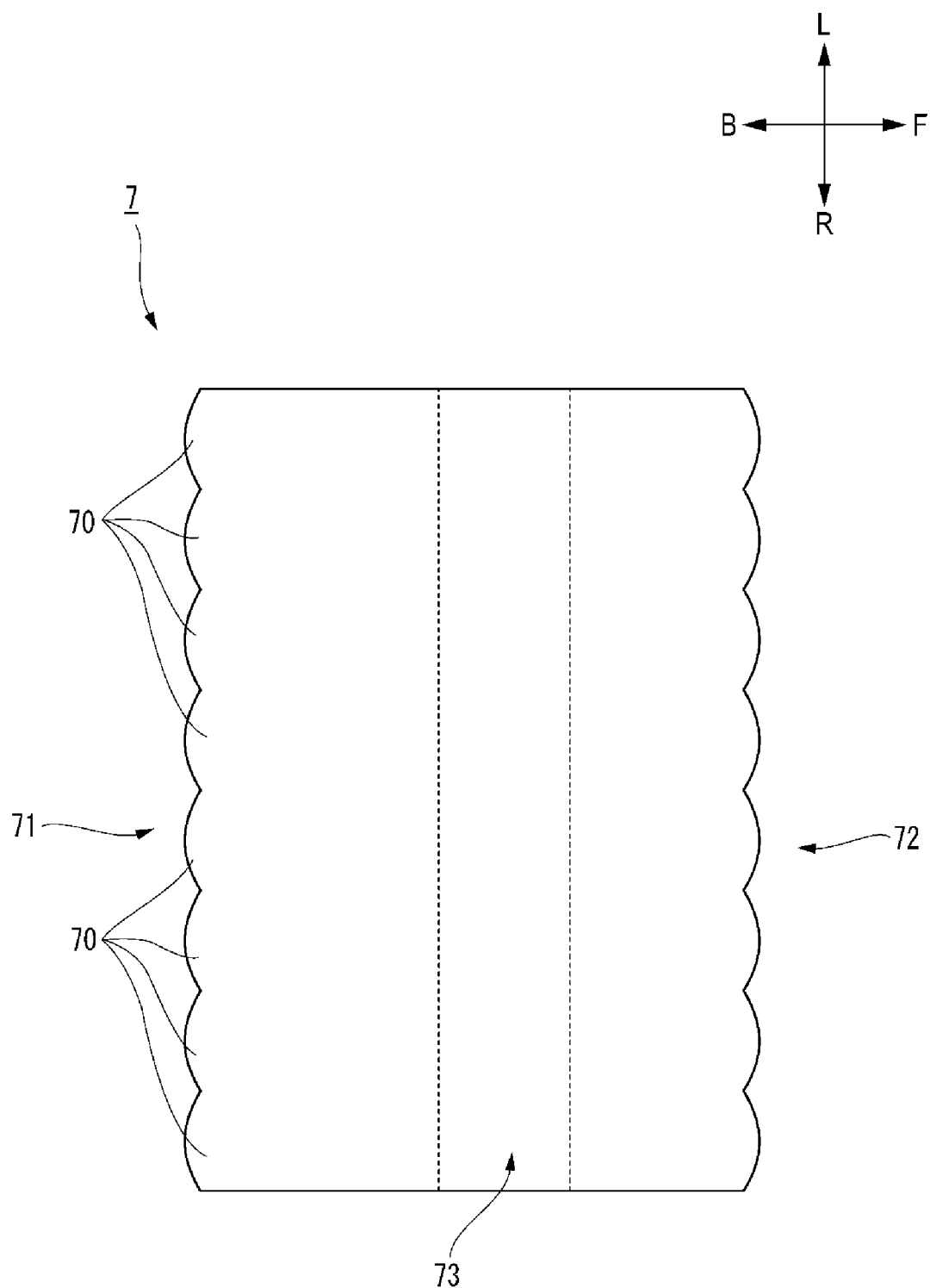
FIG. 3 is a cross-sectional view of the microlens array according to the first embodiment, seen in an up direction.
Figure 4:
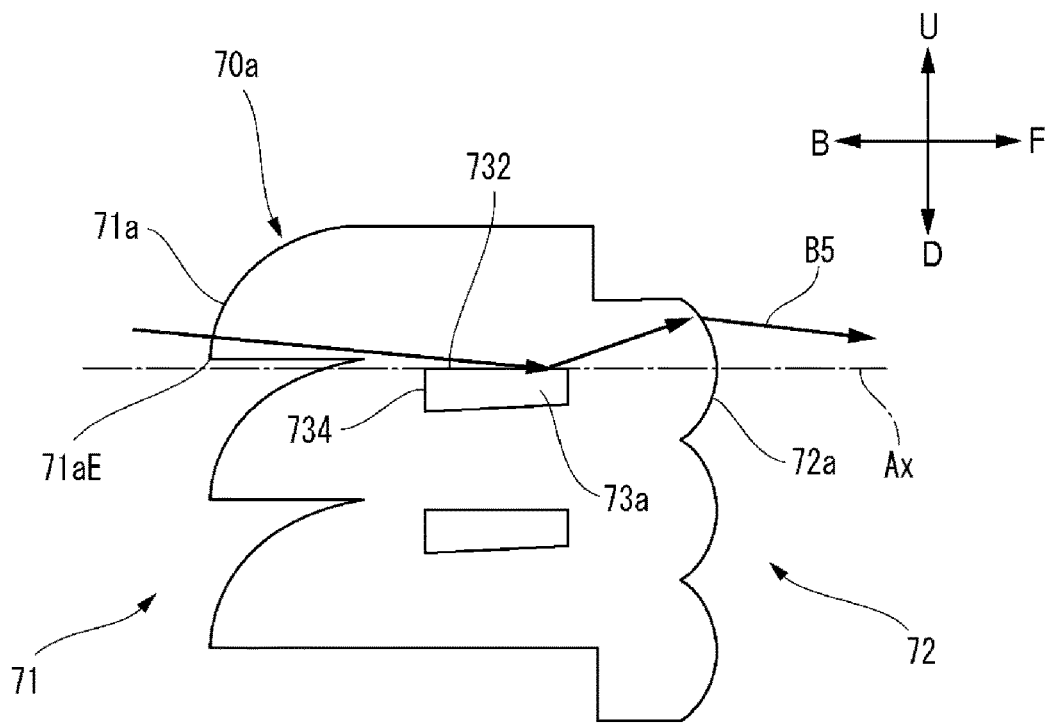
FIG. 4 is a partial enlarged view of the microlens array of FIG. 2.
Figure 5:
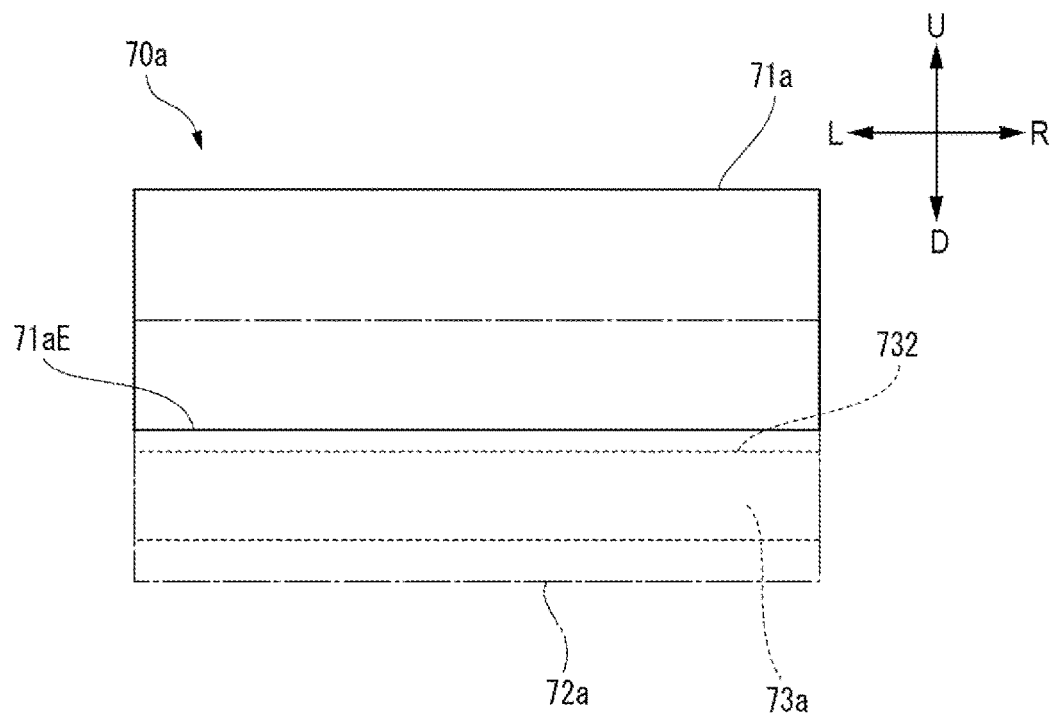
FIG. 5 is a schematic view of an optical system of FIG. 4 seen from an incidence-side lens portion side.

Next, the microlens array 7 according to a first embodiment will be described in detail with reference to FIGS. 2 to 4. FIG. 2 is a cross-sectional view of the microlens array 7 of FIG. 1, seen in the right direction. FIG. 3 is a cross-sectional view of the microlens array 7 of FIG. 1, seen in the up direction. FIG. 4 is a partial enlarged view of the microlens array 7 of FIG. 2. FIG. 5 is a schematic view of an optical system 70a of the microlens array 7 of FIG. 4, seen from an incidence-side lens portion 71 side.

As shown in FIGS. 2 and 3, the microlens array 7 has a plurality of optical systems 70. The respective optical systems 70 are adjacent in a direction orthogonal to an emission direction of light (main optical axis Mx: optical axis Ax of the incidence-side lens portion 71), and the respective optical systems 70 are integrated. In the present embodiment, the plurality of optical systems 70 are arranged adjacent to each other in the up-down direction and the left-right direction. In the shown microlens array 7, the respective optical systems 70 have the same shape and dimension as each other. The size of the optical system 70 (each microlens) is arbitrary, but is preferably about 0.5 to 10 mm square, and more preferably about 0.5 to 5 mm square, in a front view of an irradiation direction. In addition, a thickness of the optical system 70 in the front-back direction is preferably 3 mm to 40 mm.

Each of the optical systems 70 includes a pair of an incidence-side lens portion 71 and an emission-side lens portion 72, and a low refractive index portion 73. For example, as shown in FIG. 2, the optical system 70a includes a portion including an incidence surface 71a of the incidence-side lens portion 71, a portion including an emission surface 72a of the emission-side lens portion 72, and a low refractive index portion 73a. The optical systems 70b to 70f are also the same.

The incidence-side lens portion 71 is provided on the primary lens 6 side with respect to the low refractive index portion 73. The emission-side lens portion 72 is provided on the outer cover 2 side with respect to the low refractive index portion 73. The incidence-side lens portion 71 and the emission-side lens portion 72 are provided on the common optical axis Ax and face each other. The optical axis Ax of each of the optical systems 70 is parallel to the main optical axis Mx of the vehicle lamp 1. Note that, in FIG. 2, only the optical axis Ax of the optical system 70d is shown. Basically, the light incident on the incidence-side lens portion 71 of a certain optical system 70 is configured to be incident on the emission-side lens portion 72 belonging to the same optical system 70.

The incidence-side lens portion 71 and the emission-side lens portion 72 each have a convex lens shape. For example, as shown in FIG. 2, the incidence surface of the incidence-side lens portion 71 and the emission surface of the emission-side lens portion 72 each form a curved surface with a single radius of curvature when seen in the left-right direction. In addition, for example, as shown in FIG. 3, the incidence surface of the incidence-side lens portion 71 and the emission surface of the emission-side lens portion 72 each form a curved surface with a single radius of curvature when seen in the up-down direction.

The low refractive index portion 73 is provided between the pair of incidence-side lens portion 71 and emission-side lens portion 72 forming one optical system 70. For example, the low refractive index portion 73 penetrates the microlens array 7 in the left-right direction. Note that, in the present example, a shape of the low refractive index portion 73 when seen in the left-right direction is substantially rectangular, but may also be another shape such as a substantially triangular shape.

A refractive index of the low refractive index portion 73 is configured to be lower than those of other portions constituting the optical system 70 (the incidence-side lens portion 71, the emission-side lens portion 72, and a portion connecting the incidence-side lens portion 71 and the emission-side lens portion 72). For example, the low refractive index portion 73 is a cavity portion, and air, for example, exists therein. Alternatively, the low refractive index portion 73 may be made of a material different from a material forming other portions. A difference in refractive index between the low refractive index portion 73 and other portions is preferably 0.03 or greater, and more preferably 0.05 or greater. The low refractive index portion 73 may be a closed region that is sealed, or may be an open region that is not sealed.

As shown in FIG. 2, the low refractive index portion 73 has a first surface 731 extending through a focus f of the emission-side lens portion 72, and a second surface 732 extending from the first surface 731 toward the incident surface of the incidence-side lens portion 71. In addition, a cut line forming portion is formed by a boundary portion 733 between the first surface 731 and the second surface 732. The cut line forming portion forms a cut line in a light distribution pattern that is formed by the vehicle lamp 1. In the present embodiment, the first surface 731 is a surface extending in the up-down direction and the left-right direction. Additionally, the second surface 732 is a surface extending in the front-back direction and the left-right direction. The second surface 732 is configured, for example, to totally reflect light incident from the corresponding incidence-side lens portion 71 and reaching the second surface 732.

The incident surface 71a of the incidence-side lens portion 71 is provided at a position that does not overlap the second surface 732 in a front view of the incidence-side lens portion 71. For example, as shown in FIGS. 4 and 5, in the optical system 70a, a lower surface 7aE of the incident surface 71a of the incidence-side lens portion 71 is located above the second surface 732. That is, the incident surface 71a of the incidence-side lens portion 71 is provided at a position that does not overlap the second surface 732 in a front view of the incidence-side lens portion 71. In addition, the incidence surface 71a of the incidence-side lens portion 71 is located on an opposite side to the low refractive index portion 73a with respect to the optical axis Ax.

For example, as shown in FIG. 2, part of light B3 of the light incident on the incidence-side lens portion 71 of a certain optical system 70 travels toward the paired emission-side lens portion 72 and is emitted from the emission surface of the emission-side lens portion 72. In addition, light B4, which, if it is irradiated as it is, is irradiated above a cut line of a light distribution pattern and becomes glare, of the light incident on the incidence-side lens portion 71 is reflected on the second surface 732 of the low refractive index portion 73 and is then incident on the emission-side lens portion 72. Therefore, it is possible to increase utilization efficiency of light while suppressing an occurrence of glare.

However, due to a positional relationship between the incident surface of the incidence-side lens portion 71 and the second surface 732, part of the light incident on the incidence-side lens portion 71 may be incident on the low refractive index portion 73 from a surface different from the second surface 732. In this case, the light that passes through the low refractive index portion 73 and is then incident on the emission-side lens portion 72 may be emitted upward from the emission surface 72a and cause glare.

Figure 6:
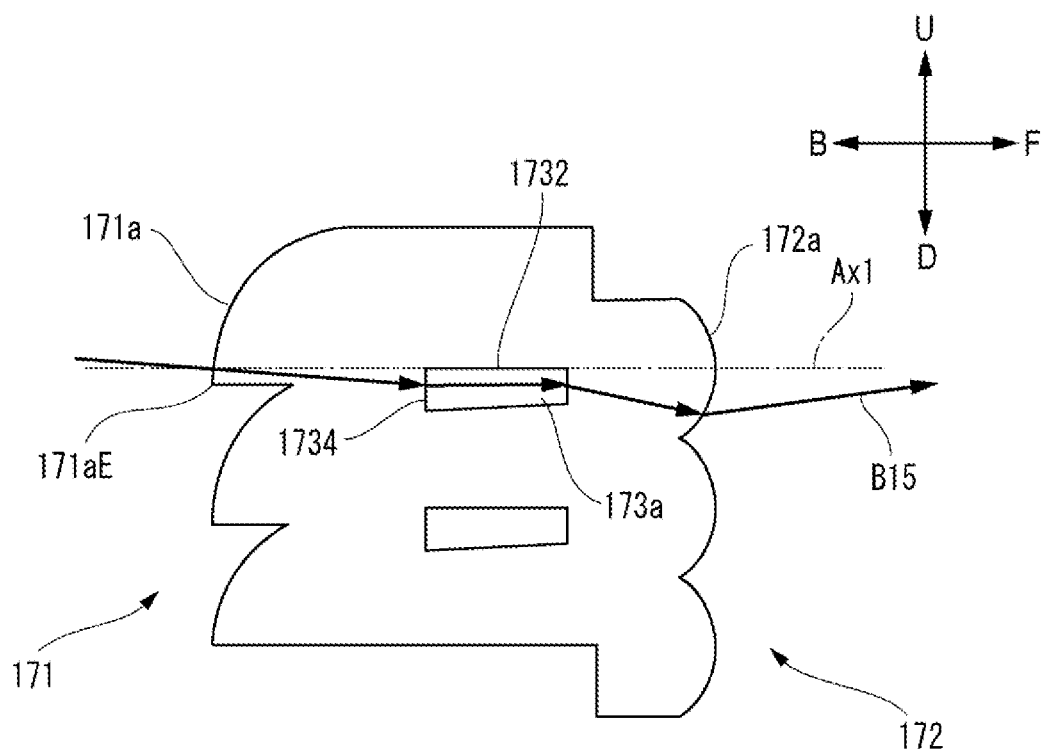
FIG. 6 is a partial enlarged view of a microlens array in which a lower surface of an incident surface is located below a second surface.

For example, FIG. 6 shows an optical system 170a in which a lower end 171aE of an incident surface 171a is located below a second surface 1732. As shown in FIG. 6, light B15 incident on a portion, which is located below the second surface 1732, of the incident surface 171a of an incidence-side lens portion 171 is incident on a low refractive index portion 173a from a side surface 1734 of the low refractive index portion 173a. Then, the light B15 incident on the low refractive index portion 173a passes through the low refractive index portion 173a and is then emitted upward from an emission surface of an emission-side lens portion 172.

Figure 7:
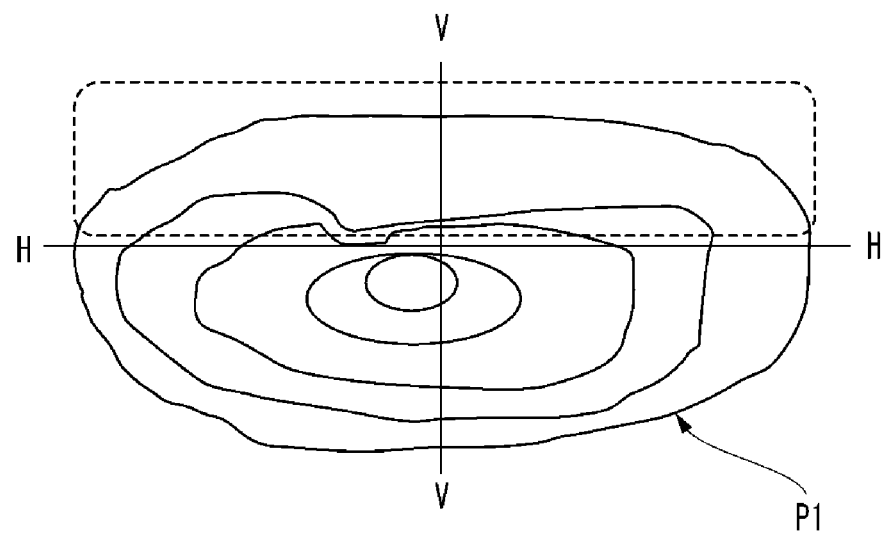
FIG. 7 is a view showing a light distribution pattern formed by a vehicle lamp having the microlens array of FIG. 6.

FIG. 7 shows a light distribution pattern P1 formed by a vehicle lamp provided with a microlens array having an optical system 170a. In FIG. 7, H-H indicates a horizontal direction (horizontal line H), and V-V indicates a vertical direction (vertical line V). The light distribution pattern P1 is a light distribution pattern that is formed on a virtual vertical screen arranged at a predetermined position ahead of the lamp, for example, a position 25 m ahead of the lamp. As shown in FIG. 7, the light distribution pattern P1 has a shape including an irradiation region (region surrounded by a broken line in FIG. 7) located above a cut line. That is, as described above, the light that passes through the low refractive index portion 173a and is then emitted upward from the emission surface of the emission-side lens portion 172 is irradiated above the cut line and becomes glare.

Figure 8:
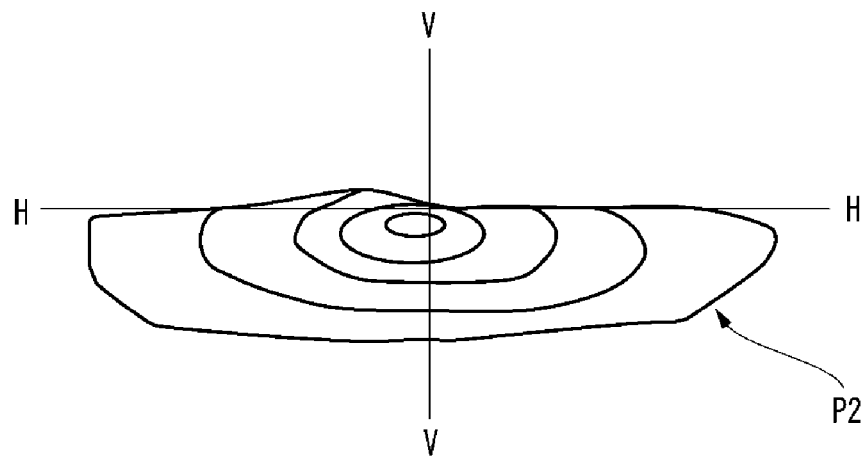
FIG. 8 is a view showing a light distribution pattern formed by a vehicle lamp having the microlens array of FIG. 2.

On the other hand, in the microlens array 7 according to the present embodiment, the lower surface 71aE of the incident surface 71a of the incidence-side lens portion 71 is located above the second surface 732, as shown in FIG. 4. That is, since there is no portion of the incident surface 71a located below the second surface 732, the light incident on the low refractive index portion 73 from the side surface 734 of the low refractive index portion 73 is considerably reduced. In other words, most of the light incident on the incidence-side lens portion 71 is directly incident on the emission-side lens portion 72, or is reflected on the second surface 732 of the low refractive index portion 73 and is then incident on the emission-side lens portion 72 (light B5 in FIG. 4). As a result, the occurrence of glare can be suppressed, and as shown in FIG. 8, a light distribution pattern P2 having a desired shape including a cut line can be formed by the vehicle lamp 1 having the microlens array 7.

Note that, in the present embodiment, the emission surface of the emission-side lens portion 72 forms a curved surface with a single radius of curvature whether seen in the left-right direction or the up-down direction. However, for example, as shown in FIG. 9, an emission surface of an emission-side lens portion 72A may have a first region 721 and a second region 722 with different radii of curvature.

Figure 9:
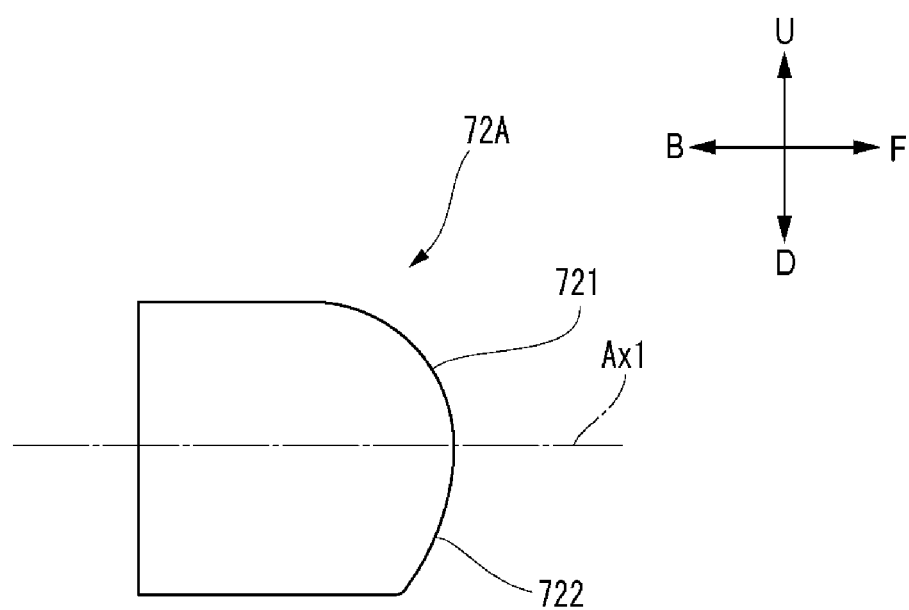
FIG. 9 is a cross-sectional view of a modified example of the emission-side lens portion, seen in the right direction.
Figure 10:
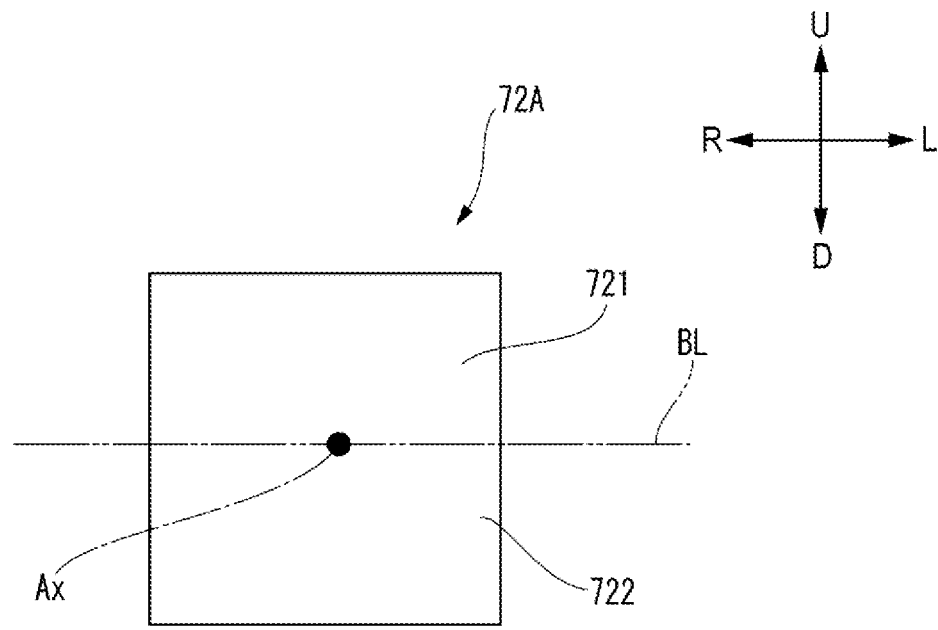
FIG. 10 is a schematic view of the modified example of the emission-side lens portion of FIG. 9, seen from an emission-side lens portion side.

FIG. 10 is a schematic diagram of the emission-side lens portion 72A of FIG. 9 seen from the emission-side lens portion 72A side. As shown in FIG. 10, for example, a boundary line BL dividing the first region 721 and the second region 722 is a line extending in the left-right direction, and the first region 721 is located above the second region 722. In the present example, the first region 721 and the second region 722 are divided so that the optical axis Ax of the emission-side lens portion 72A passes through the boundary line BL.

The first region 721 has a radius of curvature where a focus is located at a cut line forming portion. The second region 722 has a larger radius of curvature than the radius of curvature of the first region 721. For example, the radius of curvature of the second region 722 is preferably 1.1 to 1.5 times the radius of curvature of the first region 721.

The first region 721 is formed to form a curved surface with a single radius of curvature when seen in the up-down direction, as shown in FIG. 3. The second region 722 is also formed to form a curved surface with a single radius of curvature when seen in the up-down direction, as shown in FIG. 3.

Figure 11:
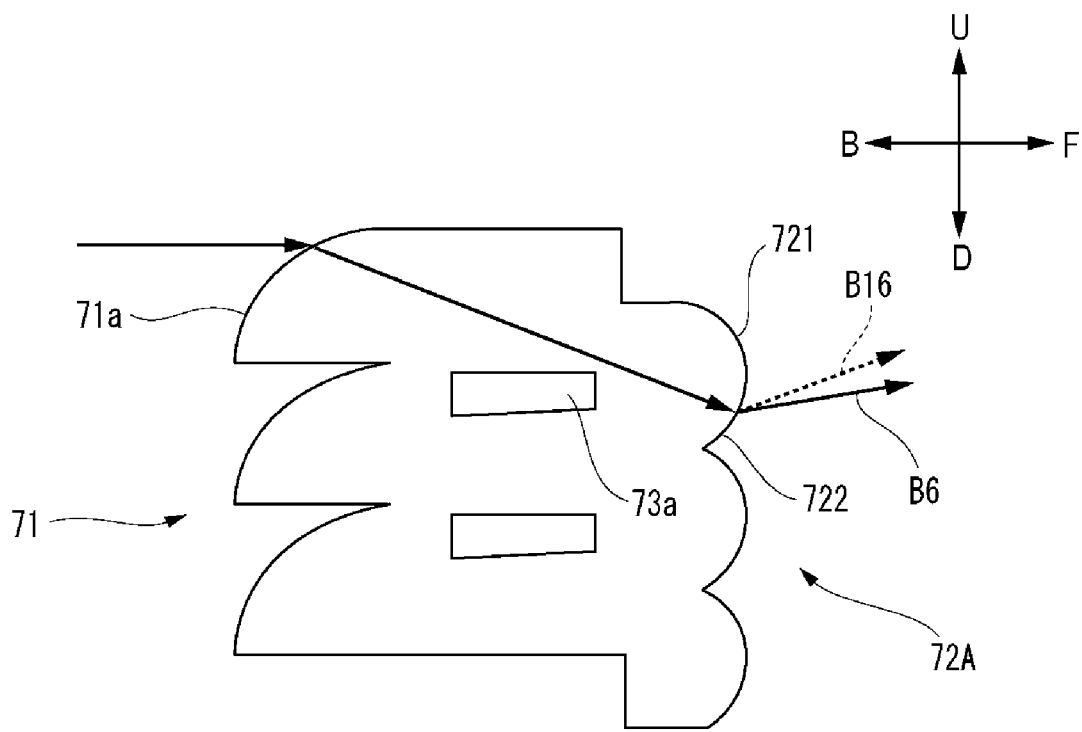
FIG. 11 is a partial enlarged view of a microlens array having the emission-side lens portion of FIG. 9.

When the emission surface of the emission-side lens portion 72 has a single radius of curvature, seen in the left-right direction, part of the light incident from the incident surface of the emission-side lens portion 72 and reaching the emission surface of the emission-side lens portion 72 is emitted upward from the emission surface and may cause glare (refer to light B16 in FIG. 11).

In contrast, in the emission-side lens portion 72A, a degree of refraction of the light emitted from the second region 722 is small, and therefore, as shown in FIG. 11, light B6 incident from the incident surface 71a of the incidence-side lens portion 71 and incident on the second region 722 of the emission surface of the emission-side lens portion 72A is emitted toward a more downward direction than the light B16 emitted from the emission surface with a single radius of curvature. Therefore, the occurrence of glare can be suppressed.

Note that such a configuration of the emission-side lens portion 72A may be applied to all the emission-side lens portions 72 constituting the microlens array 7, or may be applied to some of the emission-side lens portions 72. For example, the emission-side lens portion 72A may be applied to the emission-side lens portion 72, which is paired with the incidence-side lens portion 71 having a configuration that diffuses light with a large radius of curvature of the incident surface.

In addition, the configuration of the emission-side lens portion 72A shown in FIG. 9 can also be applied to an optical system having a configuration other than the optical system 70 in FIG. 2. For example, the configuration of the emission-side lens portion 72A can also be applied to an optical system in which the lower surface of the incident surface is located on the same level as or below the second surface 732 of the low refractive index portion 73.

Second Embodiment

Figure 12:
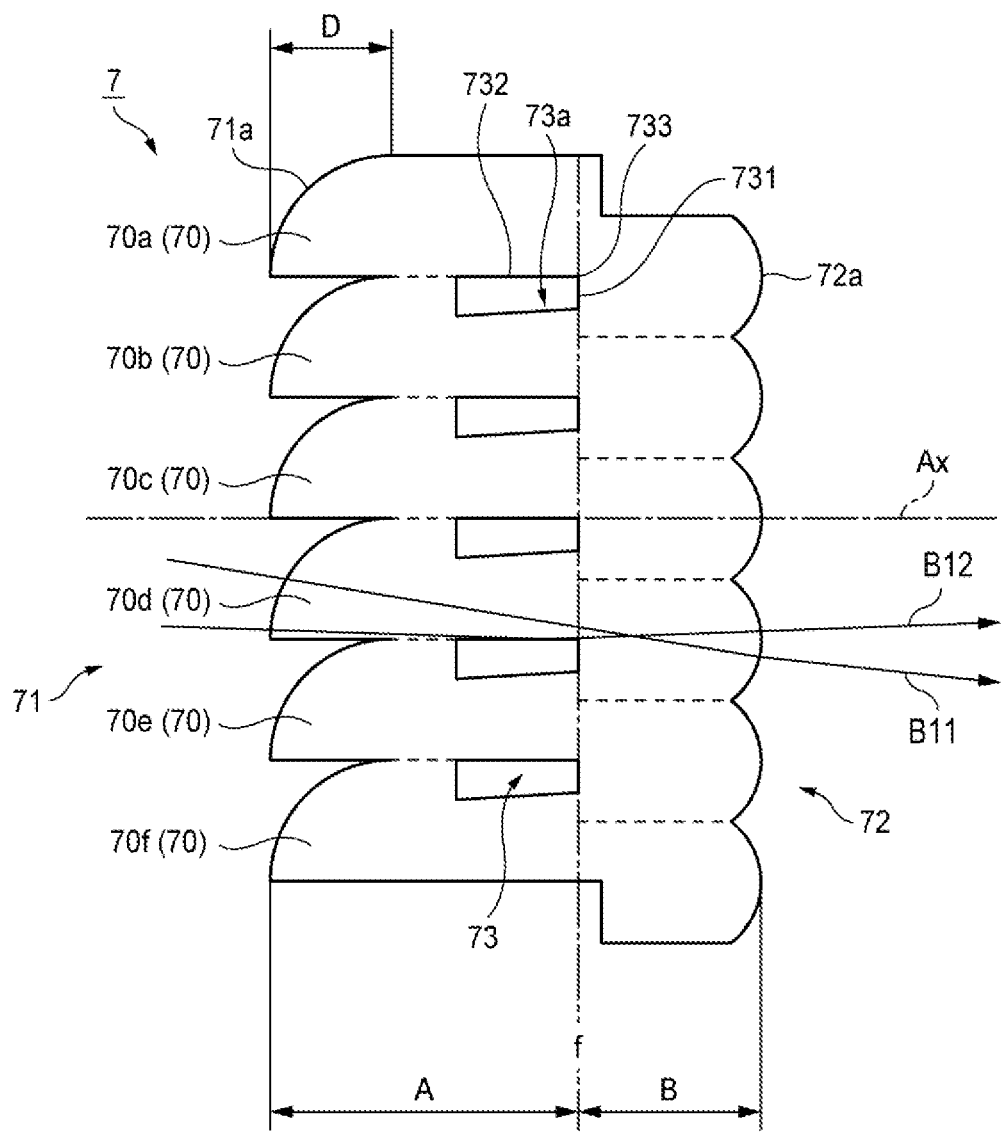
FIG. 12 is a side view of a microlens array according to a second embodiment.
Figure 12:
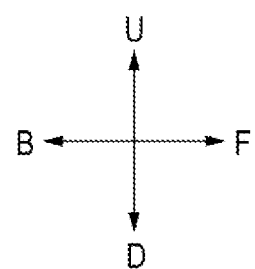

Next, the microlens array 7 according to a second embodiment will be described in detail with reference to FIGS. 12 to 14. FIG. 12 is a side view of the microlens array 7 shown in FIG. 1.

As shown in FIG. 12, the microlens array 7 has a plurality of optical systems 70. The respective optical systems 70 are adjacent in a direction orthogonal to an emission direction of light (main optical axis Mx: optical axis Ax of the incidence-side lens portion 71), and the respective optical systems 70 are integrated. Since a plurality of lens components are integrated as a single microlens array 7, the positioning accuracy of each of the optical systems 70 is high. In addition, the microlens array is facilitated in handling such as transportation. The size of the optical system 70 (each microlens) is arbitrary, but is preferably about 0.5 to 10 mm square, and more preferably about 0.5 to 5 mm square, in a front view of an irradiation direction. In addition, a thickness of the optical system 70 in the front-back direction is preferably 3 mm to 40 mm.

As shown in FIG. 12, each of the optical systems 70 includes a pair of an incidence-side lens portion 71 and an emission-side lens portion 72, and a low refractive index portion 73. For example, the optical system 70a includes a portion including an incidence surface 71a of the incidence-side lens portion 71, a portion including an emission surface 72a of the emission-side lens portion 72, and a low refractive index portion 73a. The optical systems 70b to 70f are also the same.

The incidence-side lens portion 71 is provided on the primary lens 6 side with respect to the low refractive index portion 73. The emission-side lens portion 72 is provided on the outer cover 2 side with respect to the low refractive index portion 73. The incidence-side lens portion 71 and the emission-side lens portion 72 are provided on the common optical axis Ax and face each other. The optical axis Ax of each of the optical systems 70 is parallel to the main optical axis Mx of the vehicle lamp 1. The incidence-side lens portion 71 and the emission-side lens portion 72 each have a convex lens shape. In the shown microlens array 7, the respective optical systems 70 have the same shape and dimension as each other. Note that a focal length of the emission-side lens portion 72 is equal to or less than a lens thickness D of the incidence-side lens portion 71.

The low refractive index portion 73 is provided between the pair of incidence-side lens portion 71 and emission-side lens portion 72 forming one optical system 70. The low refractive index portion 73 penetrates the microlens array 7 in a first direction (left-right direction in the example of FIG. 12). Note that in the present example, a shape of the low refractive index portion 73 when seen in the left-right direction is substantially rectangular, but may also be another shape such as a substantially triangular shape.

A refractive index of the low refractive index portion 73 is configured to be lower than those of other portions constituting the optical system 70 (the incidence-side lens portion 71, the emission-side lens portion 72, and a portion connecting the incidence-side lens portion 71 and the emission-side lens portion 72). For example, the low refractive index portion 73 is a cavity, and air, for example, may exist therein. Alternatively, the low refractive index portion 73 may be made of a material different from a material forming other portions. A difference in refractive index between the low refractive index portion 73 and other portions is preferably 0.03 or greater, and more preferably 0.05 or greater. The low refractive index portion 73 may be a closed region that is sealed, or may be an open region that is not sealed.

The refractive index portion 73 has a first surface 731 extending through a focus f of the emission-side lens portion 72, and a second surface 732 extending from the first surface 731 toward the incident surface of the incidence-side lens portion 71. In addition, a cut line forming portion is formed by a boundary portion 733 between the first surface 731 and the second surface 732. In the present embodiment, the first surface 731 is a surface extending in the up-down direction and the left-right direction. Additionally, the second surface 732 is a surface extending in the front-back direction and the left-right direction. The second surface 732 is configured, for example, to totally reflect light incident from the corresponding incidence-side lens portion 71 and reaching the second surface 732.

Basically, the light incident on the incidence-side lens portion 71 of a certain optical system 70 is configured to be incident on the emission-side lens portion 72 belonging to the same optical system 70. For example, as shown in FIG. 12, light B11 incident on the incidence-side lens portion 71 travels toward the paired emission-side lens portion 72 and is emitted from the emission surface of the emission-side lens portion 72. However, light emitted from the light source tends to expand radially, although a degree thereof varies depending on a type of the light source. For this reason, even when the shape and the like of the incidence-side lens portion are adjusted, the light emitted from the light source and incident on the incidence-side lens portion may not reach the paired emission-side lens portion. In the present embodiment, the microlens array 7 is provided with the low refractive index portion 73 having a second surface 732. Thereby, at least part of the light (light B12), which is not incident on the paired emission-side lens portion 72 as it is, of the light incident on the incidence-side lens portion 71 can be reflected on the second surface 732 of the low refractive index portion 73 and caused to be incident on the paired emission-side lens portion 72.

Each of the optical systems 70 is formed so that a ratio A:B of a thickness A from the incident surface of the incidence-side lens portion 71 to the boundary portion 733 and a thickness B from the boundary portion 733 to the emission surface of the emission-side lens portion 72 is 1.8:1 or greater. Note that in the present specification, a thickness refers to a thickness in a direction along the optical axis Ax (front-back direction in the example of FIG. 12). More specifically, the thickness A is a dimension from the most protruding portion of the incident surface of the incidence-side lens portion 71 to the boundary portion 733 on the optical axis Ax. The thickness B is a dimension from the boundary portion 733 to the most protruding portion of the emission surface of the emission-side lens portion 72 on the optical axis Ax.

Figure 13:
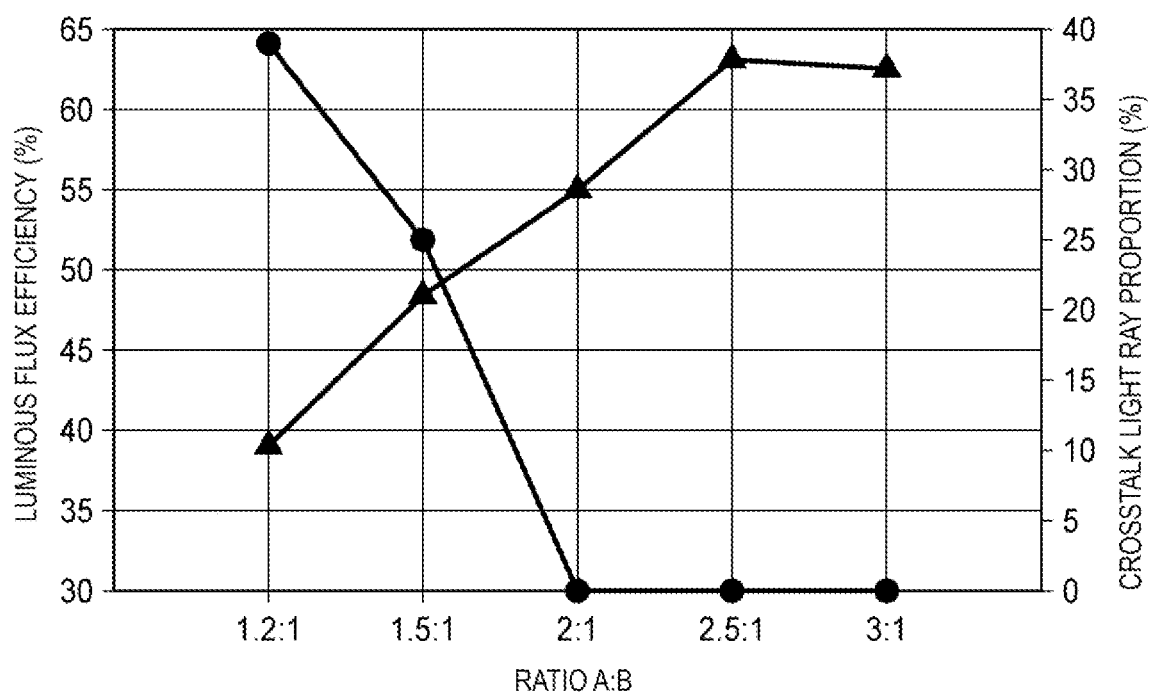
FIG. 13 illustrates a relationship among a thickness ratio of a lens portion of an optical system, a luminous flux efficiency, and a crosstalk light ray proportion.

FIG. 13 illustrates a relationship among a thickness ratio A:B of a lens portion of an optical system 70, a luminous flux efficiency, and a crosstalk light ray proportion. In FIG. 13, the horizontal axis indicates the ratio A:B. The vertical axis indicates the luminous flux efficiency and a crosstalk occurrence proportion. The black triangle indicates a value of the luminous flux efficiency, and the black circle indicates a value of the crosstalk light ray proportion.

The luminous flux efficiency (%) is a reference value calculated using simulation software.

The crosstalk light ray proportion (%) indicates a ratio (so-called crosstalk occurrence proportion of light) of light incident on the incidence surface of the incidence-side lens portion 71 being incident on the emission surface of the not-paired next emission-side lens portion 72. The crosstalk light ray proportion (%) is calculated by $\{(C-P/2)/C\} \times 100$.

Figure 14:
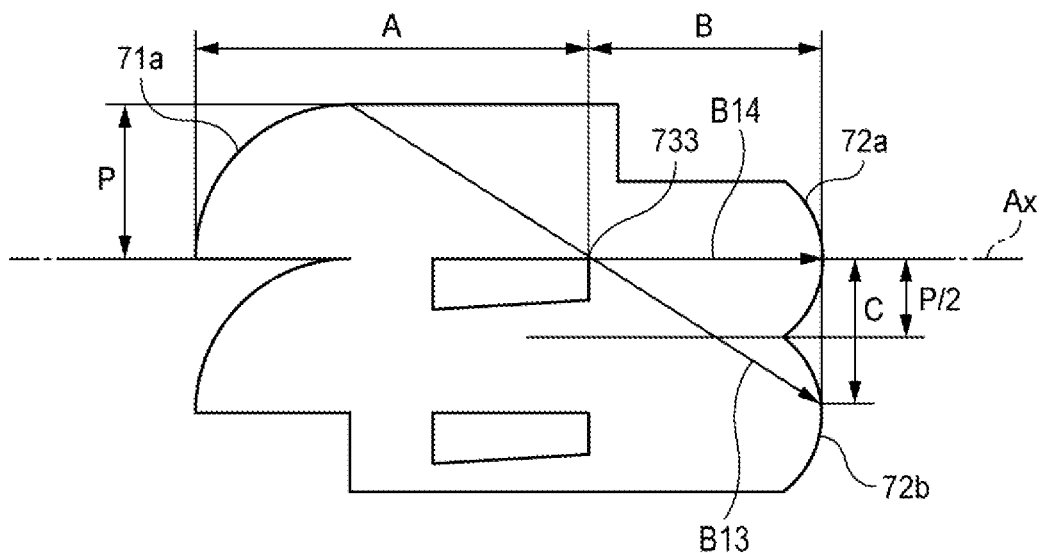
FIG. 14 is a partial enlarged view of the microlens array shown in FIG. 12.
Figure 14:
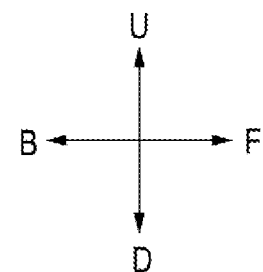

Here, as shown in FIG. 14, P is a pitch of the incidence-side lens portion 71 (emission-side lens portion 72). C is a height of light B13, which is incident on the emission surface 72b of the not-paired next emission-side lens portion 72, of light incident on the incident surface 71a of the incidence-side lens portion 71 (a height relative to light B14 incident on the emission surface 72a of the paired emission-side lens portion 72 along the optical axis Ax). $C-P/2$ is a height of a portion protruding to the next emission-side lens portion 72 in the light B13 incident on the emission surface 72b of the next emission-side lens portion 72. Note that in the present specification, a height refers to a height in a direction (up-down direction in FIG. 13) orthogonal to the optical axis Ax. In addition, since a relationship of P:C=A:B holds, the crosstalk light ray proportion (%) can be calculated by $\{(C-P/2)/C\} \times 100 = (1-A/2B) \times 100$.

As shown in FIG. 13, as the ratio A:B increases, the crosstalk occurrence proportion of light decreases, and when the ratio A:B becomes 2:1 or greater, the crosstalk occurrence proportion of light becomes zero. That is, theoretically, it was found that the crosstalk of light would not occur if the ratio A:B was 2:1 or greater. Therefore, the inventors actually prepared a plurality of samples and checked the crosstalk occurrence proportion of light. It could be confirmed that if the ratio A:B was 1.8 or greater due to dimensional errors of each portion, etc., the crosstalk occurrence of light could be suppressed.

As described above, the optical system 70 according to the present embodiment is formed so that the ratio A:B is 1.8:1 or greater. Therefore, it is possible to suppress the occurrence of crosstalk of light that part of the light incident from the incidence-side lens portion 71 is incident on the not-paired next emission-side lens portion 72 without being reflected on the second surface 732 of the low refractive index portion 73. In addition, the light incident from the incidence-side lens portion 71 and reflected on the second surface 732 of the low refractive index portion 73 can also be suppressed from being incident on the not-paired next emission-side lens portion 72. Therefore, the utilization efficiency of light can be increased.

Additionally, as shown in FIG. 13, as the ratio A:B increases, the luminous flux efficiency increases, and when the ratio A:B becomes 2.5:1 or greater, the luminous flux efficiency becomes saturated. On the other hand, as the ratio A:B increases in the optical system 70, a size of an image projected by the optical system 70 tends to increase. Therefore, each of the optical systems 70 is preferably formed so that the ratio A:B is 2.5:1 or less. By forming the optical system 70 so that the ratio A:B is 2.5:1 or less, it is possible to prevent a projection image from becoming too large relative to a requested projection image.

Note that, unlike the example shown in FIG. 14 (a configuration in which the incidence-side lens portion 71 is present on the optical axis Ax), in a configuration in which a part of the incidence-side lens portion 71 is cut off and the incidence-side lens portion 71 is not present on the optical axis Ax, the thickness A refers to, when an incidence surface is virtually extended to a position where it intersects the optical axis Ax while maintaining a curvature of the incident surface of the existing incidence-side lens portion 71, a length of a virtual line extended from a virtual point located on the optical axis Ax of the virtually extended incident surface to the boundary portion 733 along the optical axis Ax.

However, actually, an amount of deviation in a direction of an optical axis direction between the "most protruding portion of the incident surface of the incidence-side lens portion 71" and the "virtual point" is extremely small, as compared with the other dimensions B, C, and P. For this reason, even when the above equation is calculated using, as the thickness A, a distance in the direction of the optical axis Ax from the "most protruding portion of the incident surface of the existing incidence-side lens portion 71" to the boundary portion 733, it does not have a significant effect on the numerical range such as 1.8 and 2.5.

Third Embodiment

Next, the microlens array 7 according to a third embodiment will be described with reference to FIGS. 15 and 16.

Figure 15:
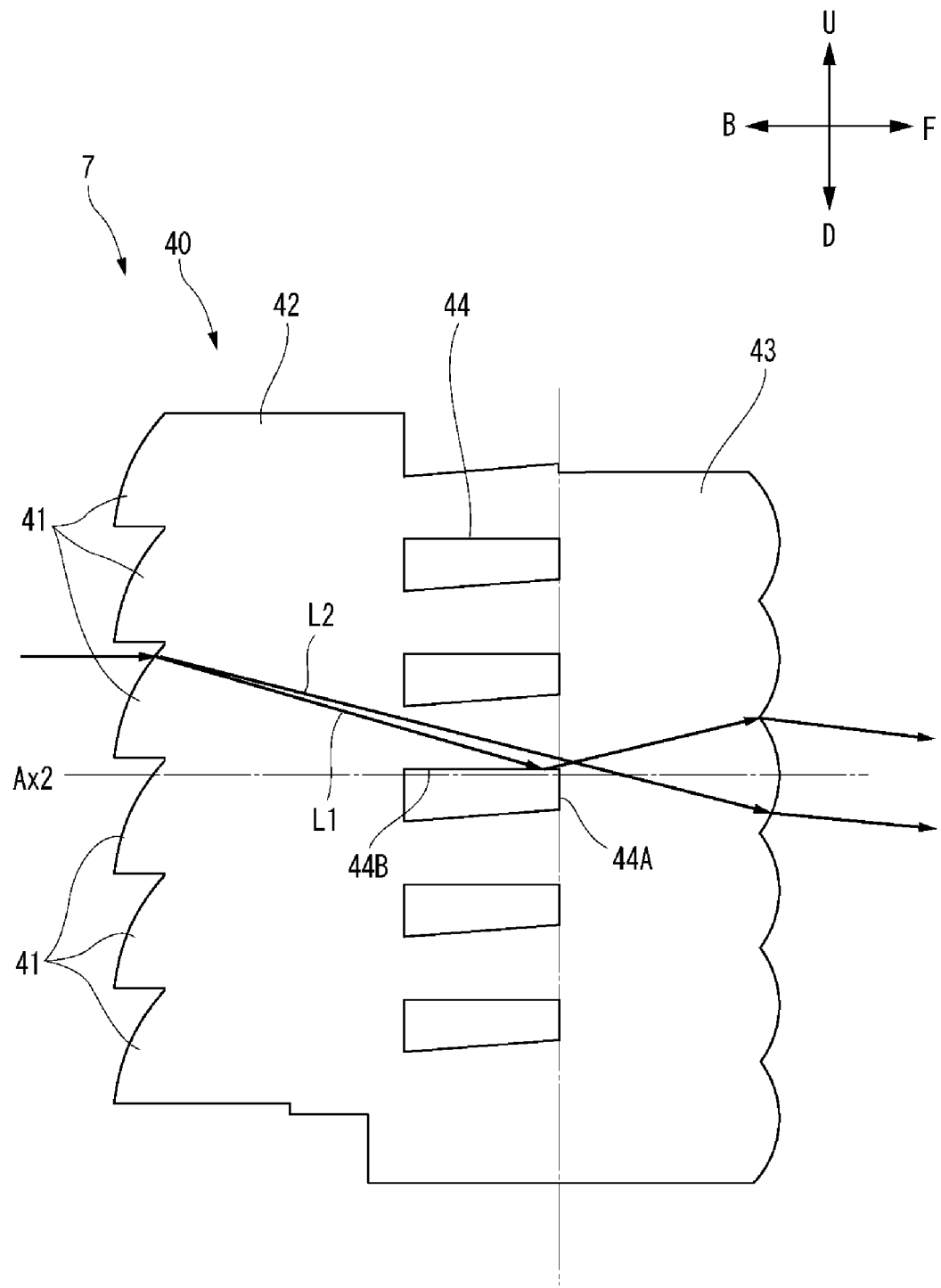
FIG. 15 is a cross-sectional view of a microlens array having a diffusion part according to a third embodiment, seen in the right direction.

FIG. 15 is a cross-sectional view of the microlens array 7 having a diffusion part 40, seen in the right direction. FIG. 16 is a cross-sectional view of the microlens array 7 having the diffusion part 40, seen in the up direction.

The microlens array 7 has a plurality of optical systems 41. The plurality of optical systems 41 are arranged adjacent to each other in the up-down direction (an example of the first direction) and the left-right direction (an example of the second direction). In the shown microlens array 7, each of the optical systems 41 has the same shape and dimension. Each of the optical systems 41 is a single optical component made of transparent resin or glass. The size of the optical system 41 is arbitrary, but for example, in a front view of a single optical system 41, it is preferably 0.5 mm to 10 mm square, and more preferably 0.5 mm to 5 mm square. In addition, a thickness of the optical system 41 in the front-back direction is preferably 3 mm to 40 mm.

Each of the optical systems 41 has a pair of an incidence-side lens portion 42 and an emission-side lens portion 43, and a cavity portion 44, respectively. The incidence-side lens portion 42 is provided on the primary lens 6 side with respect to the cavity portion 44. The emission-side lens portion 43 is provided on the outer cover 2 side with respect to the cavity portion 44. The incidence-side lens portion 42 and the emission-side lens portion 43 face each other and have a common optical axis Ax2. Note that the optical axis Ax2 is parallel to the main optical axis Mx. The incident side lens portion 42 has a convex lens shape. The incidence-side lens portion 42 is configured to cause light incident through the primary lens 6 to be incident on the corresponding emission-side lens portion 43. Note that a focus of the incidence-side lens is preferably present in the vicinity of the cavity portion 44 described below.

The cavity portion 44 is provided between the incidence-side lens portion 42 and the emission-side lens portion 43 forming one optical system 41. The cavity portion 44 is a cavity penetrating the microlens array 7 in the left-right direction. In the cavity portion 44, an arbitrary medium such as air exists. Additionally, the cavity portion may be a closed region that is sealed or an open region that is not sealed. Note that the cavity portion 44 illustrated in FIG. 15 is an open region.

As shown in FIG. 15, the cavity portion 44 has a first surface 41A and a second surface 44B. The first surface 44A is on a plane including the up-down direction and the left-right direction. The second surface 44B is on a plane including the front-back direction and the left-right direction. A cut line forming portion is formed by a boundary portion between the first surface 44A and the second surface 44B. The second surface 44B is preferably configured to totally reflect light incident from the corresponding incidence-side lens portion 42 and reaching the second surface 44B.

The emission-side lens portion 43 emits light that passes through an inside of the optical system 41 and is incident on the emission-side lens portion 43 toward the outer cover 2 side. Here, as shown in FIG. 15, when an emission surface of the emission-side lens portion 43 is seen in the left-right direction, the emission surface forms a curved surface. In addition, as shown in FIG. 16, when the emission surface of the emission-side lens portion 43 is seen in the up-down direction, the emission surface forms a flat surface.

Note that a microlens array constituted by the optical systems 41 in each of which when the emission surface of the emission-side lens portion 43 is seen in the left-right direction, the emission surface forms a curved surface, and when the emission surface of the emission-side lens portion 43 is seen in the up-down direction, the emission surface forms a flat surface may be referred to as a diffusion part 40.

Figure 16:
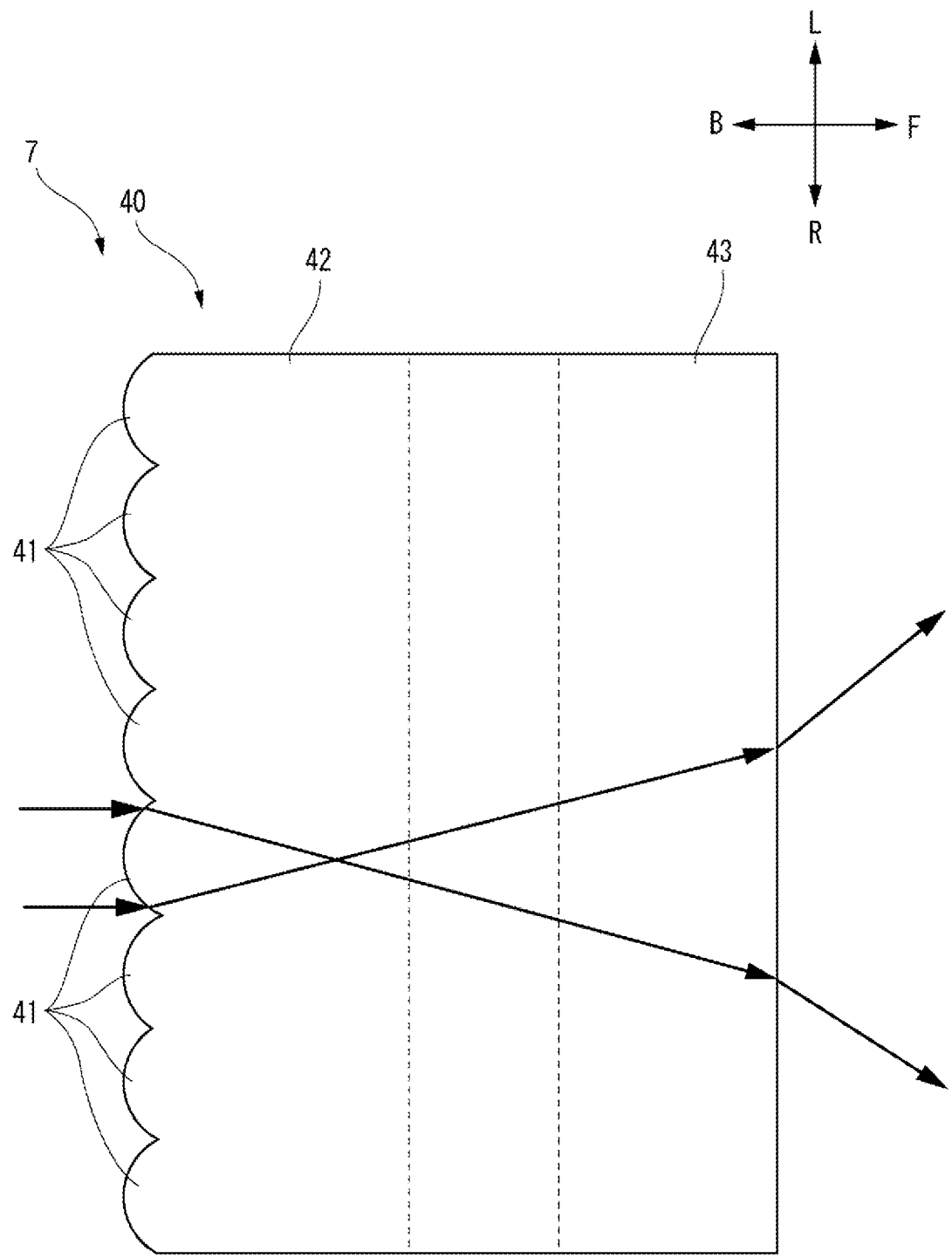
FIG. 16 is a cross-sectional view of the microlens array having the diffusion part according to the third embodiment, seen in the up direction.

Referring to FIGS. 15 and 16, a light path of light passing through the diffusion part 40 will be described.

First, the light path when the diffusion part 40 is seen in the left-right direction will be described. As shown in FIG. 15, light incident on the incident surface of the incidence-side lens portion 42 substantially in parallel to the main optical axis Mx and the optical axis Ax2 is refracted on the incident surface. Part of light L1 of the light refracted on the incident surface is totally reflected on the second surface 44B of the cavity portion 44 and travels toward the emission-side lens portion 43. The other light L2 refracted on the incident surface travels directly toward the emission-side lens portion 43. The light incident on the emission-side lens portion 43 is refracted on the emission surface of the emission-side lens portion 43.

If the light L1 is not reflected on the second surface 44B, the light may travel toward an emission-side lens portion of a different optical system that does not correspond to the incidence-side lens portion 42 on which the light L1 is incident. In this case, the light refracted on the emission surface of the emission-side lens portion and emitted may cause stray light without traveling in a desired direction. Since the microlens array 7 according to the present embodiment has the second surface 44B of the cavity portion 44, almost all of the light incident from the incidence-side lens portion 42 can be emitted from the corresponding emission-side lens portion 43, leading to a reduction in occurrence of stray light and an improvement in utilization efficiency of light.

In addition, the cut line forming portion formed by the boundary portion between the first surface 44A and the second surface 44B of the cavity portion 44 favorably shields light that would be irradiated upward by refraction on the emission surface of the emission-side lens portion 43 if it is not reflected on the second surface 44B. For this reason, light that is irradiated upward in front of the vehicle lamp 1 and may cause glare to an oncoming vehicle is hardly generated.

Next, the light path when the diffusion part 40 is seen in the up-down direction will be described. As shown in FIG. 16, light incident on the incident surface of the incidence-side lens portion 42 substantially in parallel to the main optical axis Mx is refracted on the incident surface. The light refracted on the incident surface is once converged at a focus of the incidence-side lens portion 42 and then travels in the microlens array 7 in order to diffuse again. The light incident on the emission-side lens portion 43 is refracted on the emission surface. At this time, the light refracted on the emission surface travels in order to further diffuse.

Figure 18:
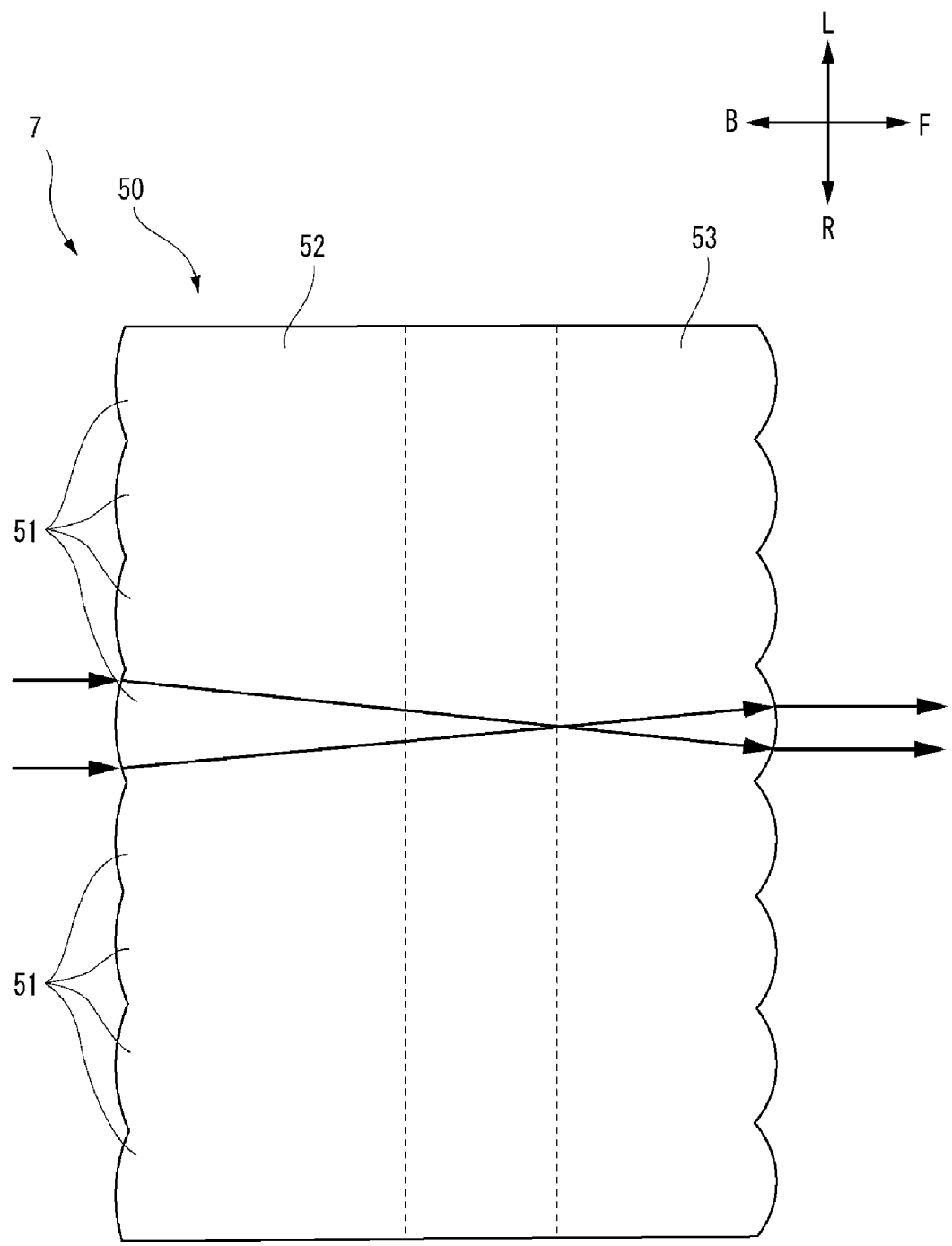
FIG. 18 is a cross-sectional view of the microlens array having the light distribution forming part, seen in the up direction.

In a microlens array as described in Patent Literature 1 (refer to also FIG. 18), the emission surface of the emission-side lens portion has a convex curved surface whether seen in the up-down direction or the left-right direction. In this case, as shown in FIG. 18, the light emitted from the emission surface of the emission surface lens tends to be condensed without diffusing. In such a microlens array, when attempting to form a light distribution pattern for a low beam, the diffusion of light in the left-right direction tends to be insufficient.

In the microlens array 7 according to the present embodiment, the emission surface of the emission-side lens portion 43 with respect to the optical system 41 constituting the diffusion part 40 forms a flat surface when seen in the up-down direction, which is the first direction, and forms a curved surface when seen in the left-right direction, which is the second direction.

Since the emission surface of the emission-side lens portion 43 of the diffusion part 40 is a curved surface when seen in the left-right direction, the light emitted from the diffusion part 40 is likely to be condensed in the up-down direction. On the other hand, since the emission surface of the emission-side lens portion 43 of the diffusion part 40 is a flat surface when seen in the up-down direction, the light emitted from the diffusion part 40 is likely to be diffused in the left-right direction.

For the vehicle lamp 1, an irradiation range in the left-right direction is required to be wider than an irradiation range in the up-down direction. According to the vehicle lamp 1 of the present embodiment, it is easy to form a light distribution pattern with a wide irradiation range in the left-right direction.

Figure 17:
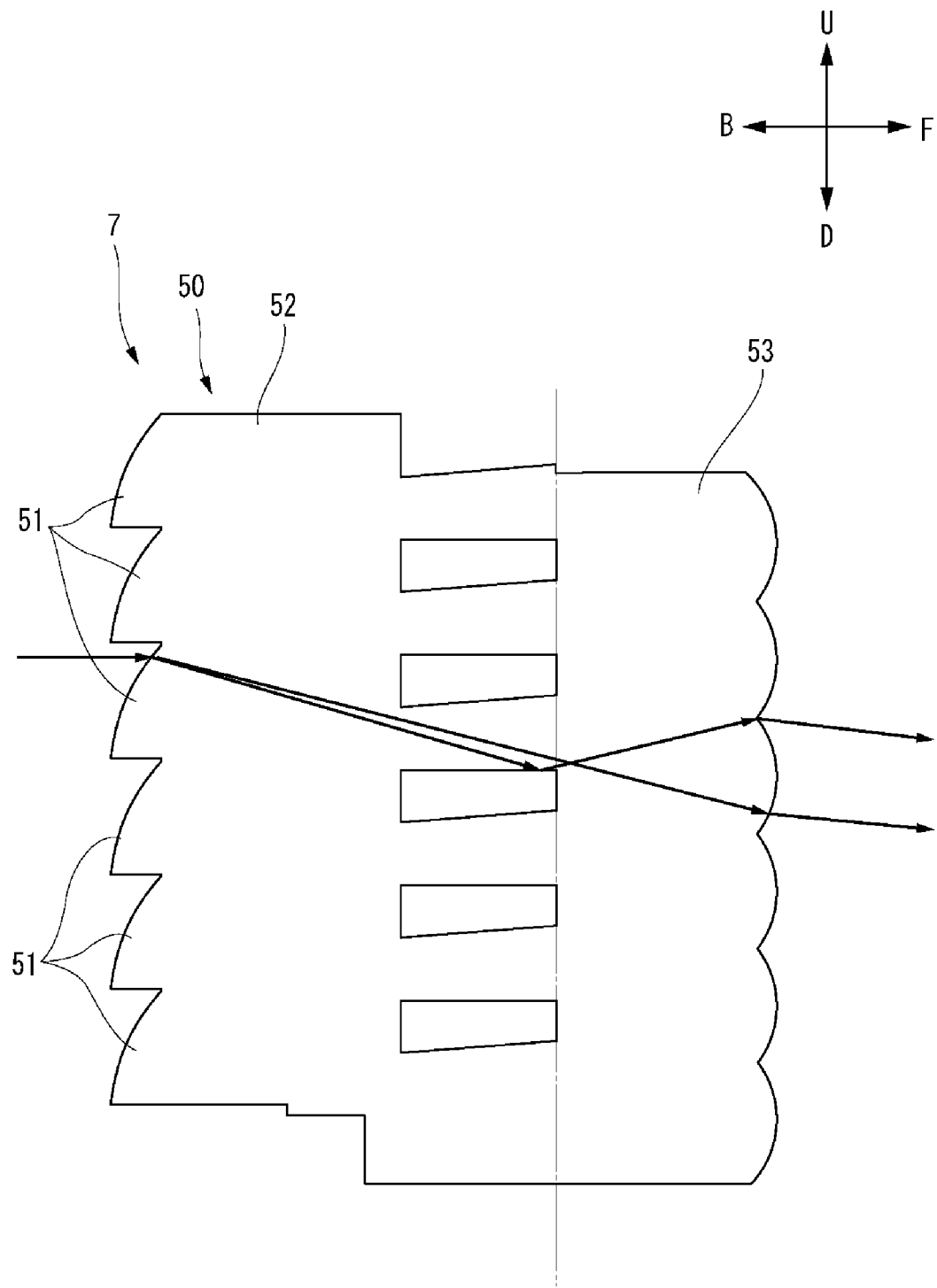
FIG. 17 is a cross-sectional view of a microlens array having a light distribution forming part, seen in the right direction.

The microlens array 7 according to the present embodiment may further include an optical system 51 constituting a light distribution forming part 50, in addition to the optical system 41 constituting the diffusion part 40. FIG. 17 is a cross-sectional view of the microlens array 7 having a light distribution forming part 50, seen in the right direction. FIG. 18 is a cross-sectional view of the microlens array 7 having the light distribution forming part 50, seen in the up direction. The light distribution forming part 50 is different from the diffusion part 40 in that the emission surface of the emission-side lens forms a curved surface even when seen in the up-down direction.

Referring to FIGS. 17 and 18, a light path of light passing through the light distribution forming part 50 will be described.

The light path when the light distribution forming part 50 is seen in the left-right direction is similar to that of the diffusion part 40. In other words, the light emitted from the emission surface of the emission-side lens portion 53 travels in order to be converged while being directed toward the substantially down direction.

Next, the light path when the light distribution forming part 50 is seen in the up-down direction will be described. As shown in FIG. 18, light incident on the incident surface of the incidence-side lens portion 52 substantially in parallel to the main optical axis Mx is refracted on the incident surface. The light refracted on the incident surface is once converged at a focus of the incidence-side lens portion 52 and then travels in the microlens array 7 in order to diffuse again. The light incident on the emission-side lens portion 53 is refracted on the emission surface. However, unlike the light path in the diffusion part 40, the light refracted on the emission surface travels in order to be converged.

The optical systems 41 and 51 of the microlens array 7 according to the present embodiment also constitute the light distribution forming part 50, in addition to the diffusion part 40. The light distribution forming part 50 is easy to form a condensed light distribution pattern. The microlens array 7 can achieve both wide irradiation of light by the diffusion part 40 and irradiation of light condensed by the light distribution forming part 50.

As shown in FIGS. 17 and 18, the incidence-side lens portions 42 and 52 of the diffusion part 40 and the light distribution forming part 50 may be each a bi-conic lens having two different radii of curvature on the incidence surface. In this case, the radii of curvature of the incidence-side lens portions 42 and 52 are different when seen in the left-right direction and when seen in the up-down direction.

Here, the radii of curvature of the incident surface of the incidence-side lens portion 42, 52 are preferably different when the diffusion part 40 and the light distribution forming part 50 are seen in the up-down direction. Comparing FIGS. 16 and 18, the radius of curvature of the incident surface of the incidence-side lens portion 42 of the diffusion part 40 is smaller than the radius of curvature of the incident surface of the incidence-side lens portion 52 of the light distribution forming part 50.

Since the radius of curvature of the incident surface of the incidence-side lens portion 42 of the diffusion part 40 is smaller than the radius of curvature of the incident surface of the incidence-side lens portion 52 of the light distribution forming part 50, a focal length of the incidence-side lens portion 42 of the diffusion part 40 becomes shorter than a focal length of the incidence-side lens portion 52 of the light distribution forming part 50. As a result, the light passing through the diffusion part 40 is further diffused.

Figure 19:
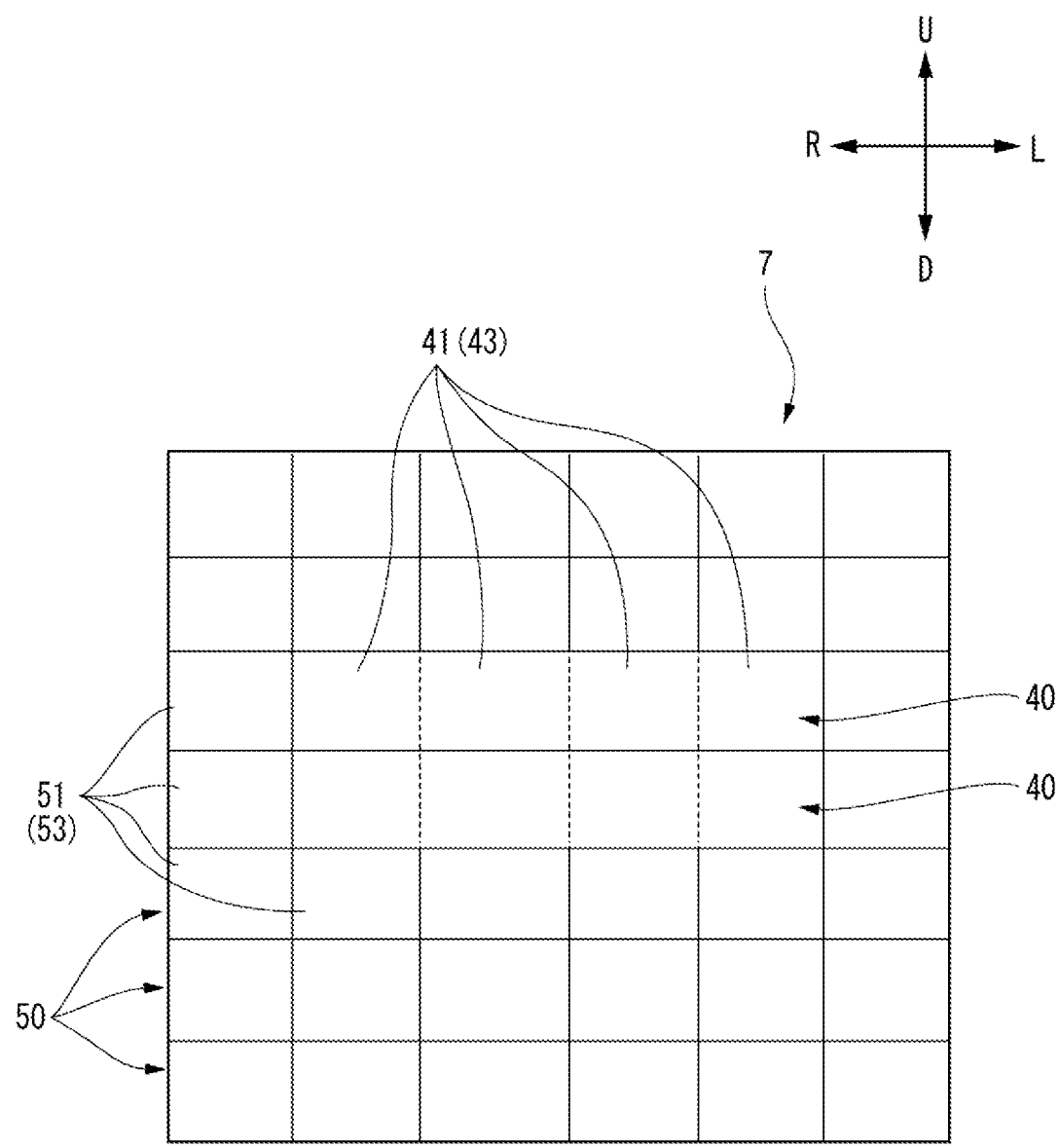
FIG. 19 is a view of emission-side lens portions of a plurality of optical systems constituting a microlens array, seen from the front.

FIG. 19 is a view of the emission-side lens portions 43, 53 of the plurality of optical systems 41, 51 constituting the microlens array 7, seen from the front. As shown in FIG. 19, the diffusion parts 40 are surrounded by the light distribution forming parts 50. With this configuration, the microlens array 7 with high designability can be realized.

The vehicle lamp 1 according to the present embodiment includes the microlens array 7 described above, in addition to the light source 5 and the primary lens 6. Thereby, the vehicle lamp 1 capable of irradiating further diffused light can be realized.

Figure 20:
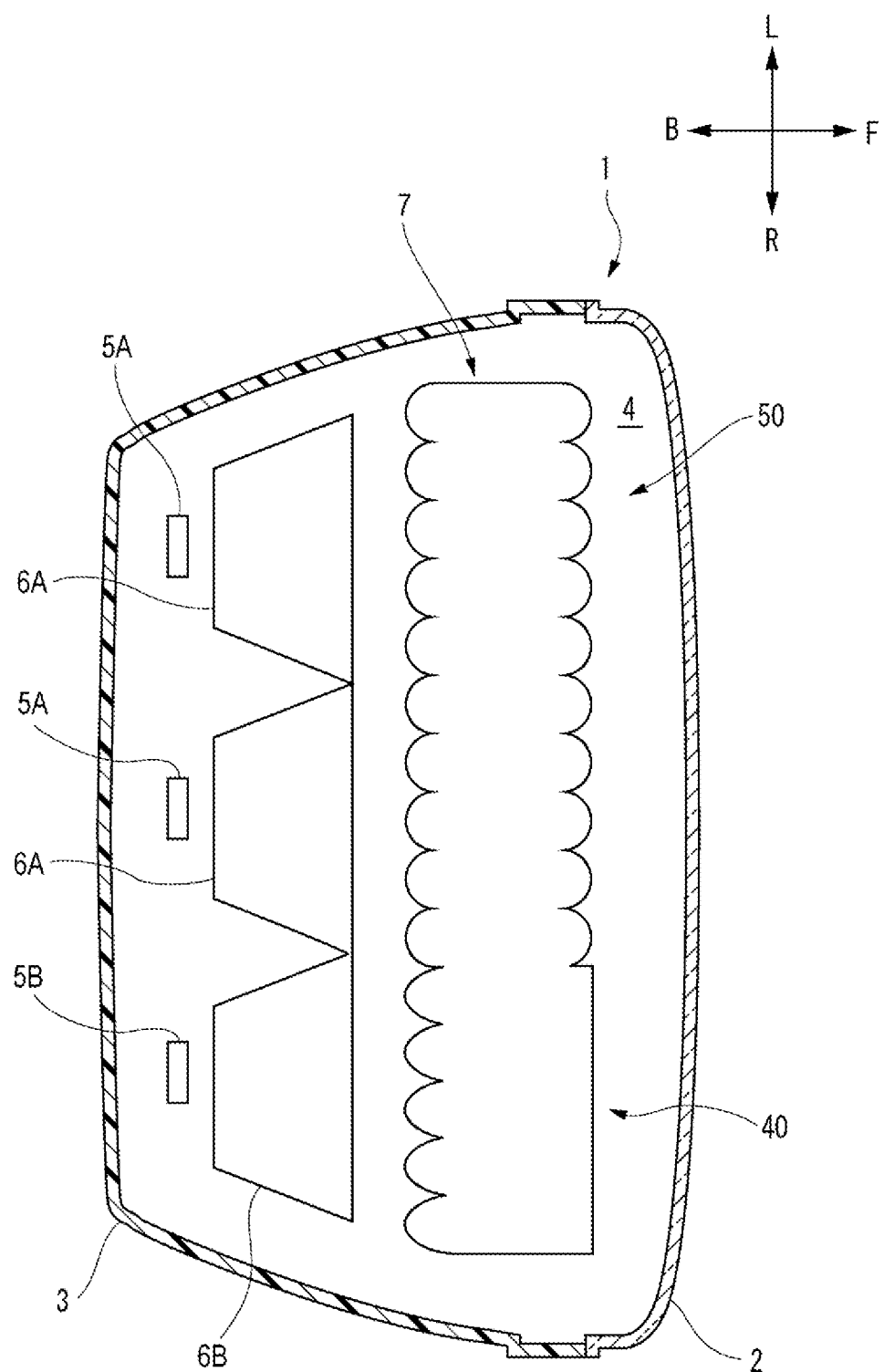
FIG. 20 is a cross-sectional view of a vehicle lamp, seen in the up direction.

In the vehicle lamp 1 according to the present embodiment, the light source for irradiating light to the diffusion part 40 and the light distribution forming part 50 may be configured separately. FIG. 20 is a cross-sectional view of the vehicle lamp 1, seen in the up direction. The light chamber 4 is provided with a first light source 5A, a second light source 5B, a first primary lens 6A, and a second primary lens 6B, in addition to the microlens array 7 having the diffusion part 40 and the light distribution forming part 50. Light emitted from the first light source 5A is incident on the light distribution forming part 50 via the first primary lens 6A. Light emitted from the second light source 5B is incident on the diffusion part 40 via the second primary lens 6B.

In such a vehicle lamp 1, the light irradiated from the first light source 5A passes through the first primary lens 6A and is incident on the light distribution forming part 50, and the light irradiated from the second light source 5B passes through the second primary lens 6B and is incident on the diffusion part 40. Since the light distribution forming part 50 and the diffusion part 40 are independently provided with the light source and primary lens, respectively, it is easy to optically design the vehicle lamp 1.

Note that the example of the vehicle lamp that divides the light source for irradiating light to the diffusion part 40 and the light distribution forming part 50 has been described, but the vehicle lamp may also be configured to irradiate light from one light source toward a microlens array having a diffusion part and a light distribution forming part.

In the above, the present disclosure has been described based on the embodiments. The present embodiments are examples of the present disclosure, are not limited to the above embodiments and can be freely modified and improved appropriately. In addition, the material, shape, dimension, numerical value, form, number, arrangement location, and the like of each constitutional element in the embodiments described above are arbitrary and are not particularly limited as long as the present disclosure can be achieved.

The microlens array 7 of the present disclosure is suitable for use in vehicle lamp, but may also be used in lamps for other uses.

The subject application is based on Japanese Patent Application Nos. 2021-139973 filed on Aug. 30, 2021, 2021-139974 filed on Aug. 30, 2021 and 2021-139975 filed on Aug. 30, 2021, which are incorporated herein by reference.

The invention claimed is:

1. A microlens array comprising:
a plurality of optical systems,
wherein each of the optical systems comprises a pair of an incidence-side lens portion and an emission-side lens portion, respectively,
wherein a low refractive index portion is provided between an incident surface of the incidence-side lens portion and an emission surface of the emission-side lens portion,
wherein a refractive index of the low refractive index portion is lower than refractive indexes of other portions,
wherein the low refractive index portion comprises a first surface extending through a focus of the emission surface and a second surface extending from the first surface toward the incident surface,
wherein a cut line forming portion is formed by a boundary portion between the first surface and the second surface, and
wherein the incident surface is provided at a position that does not overlap the second surface in a front view of the incidence-side lens portion,
wherein in at least one of the optical systems,
the emission surface of the emission-side lens portion is divided into a first region and a second region,
the first region has a radius of curvature where a focus is located at the cut line forming portion, and
the second region has a radius of curvature greater than the radius of curvature of the first region.

2. The microlens array according to claim 1, wherein the low refractive index portion is a cavity portion.

3. The microlens array according to claim 1, wherein the incident surface is located on an opposite side to the low refractive index portion with respect to an optical axis of the emission-side lens portion.

4. The microlens array according to claim 1, wherein an optical axis of the emission-side lens portion passes through a boundary line between the first region and the second region.

5. The microlens array according to claim 1, wherein the radius of curvature of the second region is 1.1 to 1.5 times the radius of curvature of the first region.

6. A vehicle lamp comprising:
a light source; and
the microlens array according to claim 1.

* * * * *